(12) United States Patent
Hirunyachoke et al.

(10) Patent No.: US 10,589,912 B2
(45) Date of Patent: Mar. 17, 2020

(54) SIMPLIFIED STACKED PALLET AND METHOD OF MAKING THE SAME

(71) Applicant: H.B. Fuller Company, St. Paul, MN (US)

(72) Inventors: Nattavud Hirunyachoke, Bangkok (TH); Monthon Tabthong, Pathumthani (TH); Thanongdet Semma, Bangkok (TH)

(73) Assignee: H.B. Fuller Company, St. Paul, MN (US)

( * ) Notice: Subject to any disclaimer, the term of this patent is extended or adjusted under 35 U.S.C. 154(b) by 209 days.

(21) Appl. No.: 15/499,485

(22) Filed: Apr. 27, 2017

(65) Prior Publication Data

US 2017/0313488 A1   Nov. 2, 2017

Related U.S. Application Data

(60) Provisional application No. 62/328,808, filed on Apr. 28, 2016.

(51) Int. Cl.

| | | |
|---|---|---|
| *B29C 63/04* | (2006.01) | |
| *B65D 71/00* | (2006.01) | |
| *B29C 63/00* | (2006.01) | |
| *B29C 65/48* | (2006.01) | |
| *B65B 17/02* | (2006.01) | |
| *B65B 53/02* | (2006.01) | |
| *B65D 19/00* | (2006.01) | |
| *B65D 21/02* | (2006.01) | |
| *B65D 71/08* | (2006.01) | |
| *C09J 5/00* | (2006.01) | |
| *C09J 123/08* | (2006.01) | |
| *B29K 667/00* | (2006.01) | |
| *B29L 31/00* | (2006.01) | |

(52) U.S. Cl.
CPC ...... *B65D 71/0096* (2013.01); *B29C 63/0065* (2013.01); *B29C 63/04* (2013.01); *B29C 65/4815* (2013.01); *B65B 17/02* (2013.01); *B65B 53/02* (2013.01); *B65D 19/0004* (2013.01); *B65D 21/0227* (2013.01); *B65D 71/08* (2013.01); *C09J 5/00* (2013.01); *C09J 123/08* (2013.01); *B29K 2667/003* (2013.01); *B29K 2995/0049* (2013.01); *B29L 2031/7178* (2013.01); *B65D 2571/00012* (2013.01); *B65D 2571/00067* (2013.01); *C09J 2201/61* (2013.01); *C09J 2203/10* (2013.01); *C09J 2423/04* (2013.01); *C09J 2467/006* (2013.01)

(58) Field of Classification Search
CPC ..... B29C 63/04; B29C 65/4815; B65D 71/08; B65D 71/0096; B65B 53/02; B65B 17/02
USPC ......................................................... 206/597
See application file for complete search history.

(56) References Cited

U.S. PATENT DOCUMENTS

| | | |
|---|---|---|
| 4,365,710 A | 12/1982 | Swanson |
| 5,331,038 A | 7/1994 | Dillman |

(Continued)

FOREIGN PATENT DOCUMENTS

EP    2107009    3/2009

*Primary Examiner* — King M Chu
(74) *Attorney, Agent, or Firm* — Kirsten Stone; Kristi Halloran

(57) ABSTRACT

The inventors have discovered that certain hot melt adhesives can be used to form a stable stacked pallet that can limit the need for additional packaging materials e.g. interlayer and pallet wrap.

20 Claims, 2 Drawing Sheets

(56) References Cited

U.S. PATENT DOCUMENTS

| | | | |
|---|---|---|---|
| 5,624,986 A * | 4/1997 | Bunnelle | A61L 15/24 |
| | | | 524/270 |
| 6,021,890 A | 2/2000 | Focke et al. | |
| 7,048,817 B1 | 5/2006 | Hammond | |
| 8,404,079 B1 | 3/2013 | Kueppers et al. | |
| 8,454,792 B2 | 6/2013 | Kueppers et al. | |
| 2011/0005955 A1 | 1/2011 | Laupie | |
| 2011/0036741 A1* | 2/2011 | Moehlenbrock | B65B 9/067 |
| | | | 206/484 |
| 2012/0259050 A1 | 10/2012 | Vitrano et al. | |
| 2014/0238881 A1 | 8/2014 | Stuhlmann et al. | |
| 2015/0197671 A1* | 7/2015 | Becker | B32B 37/1207 |
| | | | 206/503 |
| 2016/0096983 A1* | 4/2016 | Burckhardt | C08G 18/7671 |
| | | | 525/454 |

* cited by examiner

SIMPLIFIED STACKED PALLET AND METHOD OF MAKING THE SAME

CROSS-REFERENCE TO RELATED APPLICATIONS

This application claims the benefit of a U.S. provisional application having a Ser. No. 62/328,808 filed Apr. 28, 2016.

BACKGROUND

Primary packages are often gathered together in groups and enclosed in a secondary package such as a shrinkable or stretchable film. The secondary packages can then be arranged into layers and stacked on a pallet for storage and transportation.

In order to stabilize the stacked pallet for transportation, there is often additional materials present. For example, there can be a layer of cardboard or chip board between the layers of secondary packages (inter-layer). In addition, the entire stacked pallet can be wrapped with a stretchable plastic film (pallet wrap).

It would be advantageous if a simplified, stable stacked pallet could be formed using fewer packaging materials.

SUMMARY

In one aspect, the invention features a stacked pallet including a pallet, a plurality of layers of secondary packages stacked on the pallet, and a hot melt adhesive sandwiched between the layers of secondary packages thereby adhering the layers to each other, the hot melt adhesive including a polymer selected from the group consisting of ethylene copolymers derived from ethylene and a co-monomer that includes vinyl unsaturation, styrene block copolymers, and olefin based polymers, and no greater than 10% by weight of a plasticizer.

In one embodiment, the stacked pallet is free of inter-layer. In a different embodiment, the secondary packages include at least 4 primary packages. In one embodiment, the secondary packages are formed by a shrinkable film. In a different embodiment, the primary packages comprise a beverage packaged in a plastic container. In one embodiment the plastic container comprises PET. In another embodiment, each layer of secondary packages is in an interlock formation.

In one embodiment, the hot melt adhesive is applied to the top of each of the primary package. In another embodiment, the hot melt adhesive has a viscosity of no greater than about 2500 cps at 149° C. In a different embodiment, the hot melt adhesive has a wax content of from about 5% to about 20% by weight. In one embodiment, the hot melt adhesive has a plasticizer content of no greater than about 5% by weight. In still another embodiment, the hot melt adhesive has a plasticizer content of from about 1% to about 10% by weight and a wax content of from about 5% to about 20% by weight.

In one embodiment, the pallet includes a hot melt adhesive including an olefin based polymer. In a different embodiment, the olefin based polymer is a single site catalyzed polymer.

Another embodiment includes a stacked pallet where the hot melt adhesive is applied as a bead. In one embodiment, each secondary package comprises from about 0.5 to about 3.0 grams of the hot melt adhesive.

In a second aspect, the invention feature a method of stacking a pallet including grouping a plurality of primary packages, encasing the primary packages in a plastic film shrunk by heat to form a plurality of individual secondary packages, applying hot melt adhesive to at least two locations on the top of each of the individual secondary packages; and arranging the plurality of individual secondary packages on a pallet to form a plurality of layers, where the hot melt adhesive is sandwiched between two layers of secondary packages, the hot melt adhesive including a polymer selected from the group consisting of ethylene copolymers derived from ethylene and a co-monomer that includes vinyl unsaturation, styrene block copolymers, and olefin based polymers, and no greater than 10% by weight of a plasticizer.

In one embodiment, the hot melt adhesive is applied in a bead to the top of each primary package. In a different embodiment, the hot melt is applied at a temperature of no greater than about 150° C. In another embodiment, the secondary packages are arranged in an interlock formation.

The inventors have discovered that adhesive can be used to form a stable stacked pallet using fewer packaging materials e.g. inter-layer and pallet wrap. The adhesive stabilizes the pallet while at the same time allowing the secondary packages to be easily removed from the pallet at the point of use.

Glossary

A primary package is defined as a single packaged item.

A secondary package is defined as more than one primary package gathered into a group. The group is held together by a gathering means. The gathering means can be plastic (e.g. shrinkable film, stretch film, plastic loops, etc.).

DETAILED DESCRIPTION

Stacked Pallet

The invention includes a stacked pallet including a pallet, a plurality of layers of secondary packages stacked on the pallet, and an adhesive sandwiched between the layers of secondary packages thereby adhering the top of each secondary package to the bottom of the secondary package in the layer directly above it.

The stacked pallet includes fewer packaging materials. The stacked pallet can have a reduced amount of inter-layer (i.e. 3 or fewer sheets), or even can be free of inter-layer. The stacked pallet can have a reduced amount of pallet wrap, or even can be free of pallet wrap. Alternatively, the stacked pallet can be free of inter-layer and pallet wrap. The inter-layer is a cellulose based board (e.g. card board, chip board, etc.). The inter-layer is commonly laid horizontal to the platform between layers of secondary packages. Pallet wrap is a plastic film that is wound around the outside of a stacked pallet.

The stacked pallet includes at least two layers of secondary packages.

The adhesive can be applied to the top of the secondary packages in a variety of ways e.g. bead (e.g. single bead, double bead, etc.), swirl, dot, etc. The adhesive can be applied to two or more positions on the top of the secondary package, alternatively the adhesive can be applied to the top of each primary package that makes up the secondary package. The adhesive can be applied after the secondary package is formed. The top layer of the pallet can be free of adhesive. Each secondary package can comprise from 0.5 to 3.0 grams of adhesive.

Secondary Packages

The secondary packages are arranged on the pallet in layers. In each layer the secondary packages can be arranged in any possible way.

Figure 1:
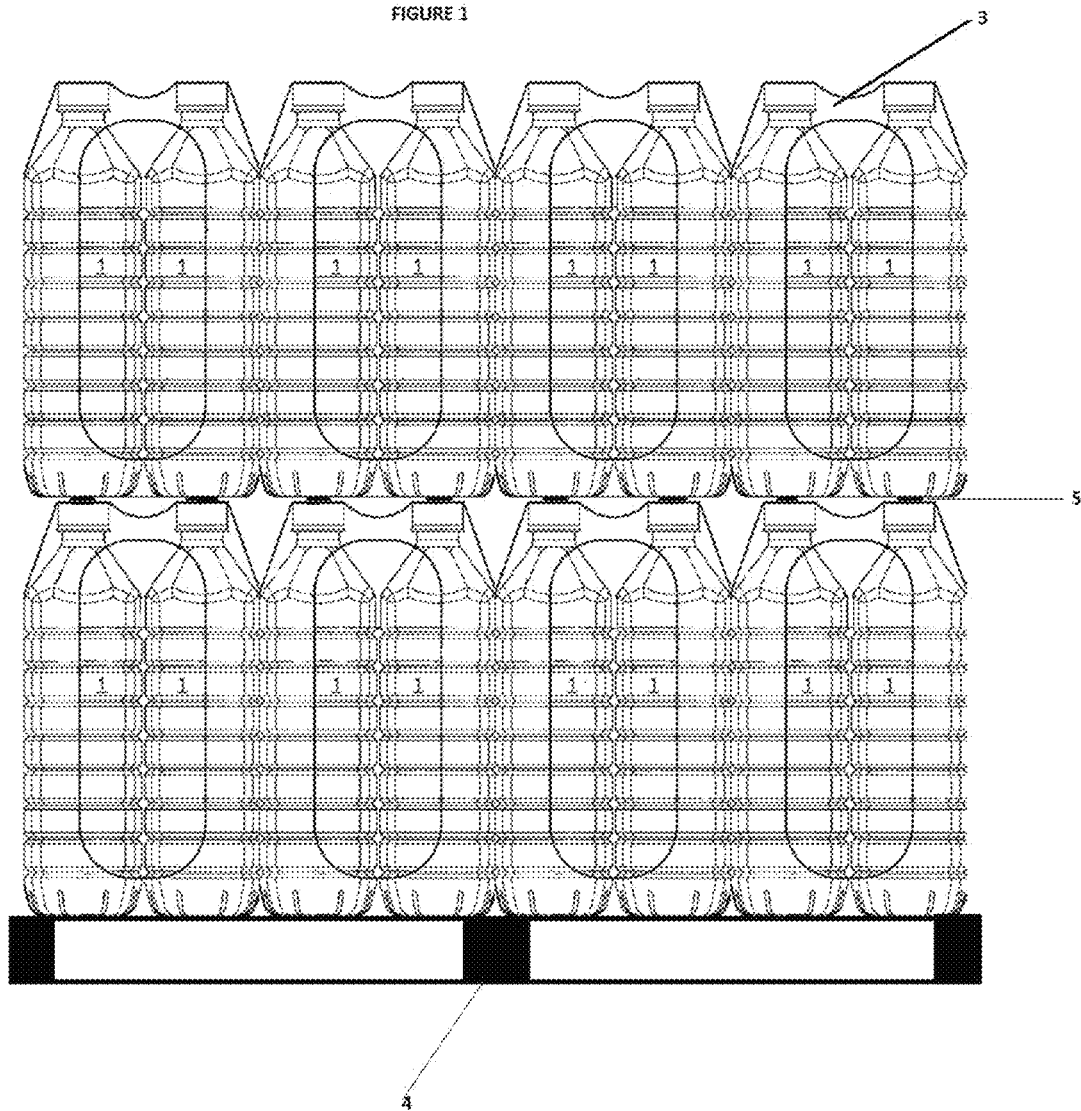
FIG. 1 is a front view of two layers of a stacked pallet, including primary packages (1) grouped into secondary packages using shrink wrap (3) and stacked on a pallet (4) stabilized with adhesive (5). The stacked pallet is free of inter-layer.

In one embodiment, the secondary packages can be arranged in an interlock formation. In this arrangement the direction of the secondary packages varies in groups relative to each other. For example in FIG. 2, the secondary packages in group (A) are facing one direction and the secondary packages in group (B) a different direction. The secondary packages can also be arranged in a column formation (FIG. 1). In this arrangement, the packages are stacked one on top of the other, all facing the same direction, forming columns.

The secondary package includes more than one primary package gathered into a group. The secondary package is held together with a gathering means. The gathering means can be plastic (e.g. shrinkable film (e.g. heat shrinkable film), stretch film, plastic loops). The secondary package includes more than one primary package. The secondary package can include at least 4, at least 6, at least 8, at least 12, or even from about 4 to about 16 primary packages. The primary packages can be arranged in a variety of configurations. In one configuration, the primary packages when gathered together into a secondary package roughly form a rectangle or a square, with the primary packages lined up in rows of three or four, i.e. 4×6, 4×3, 3×2.

Primary Package

The primary package is a single packaged item. It can be packaged in any type of container including e.g. bottle, can, flexible package, etc. The container can be formed from a material selected from plastic, metal and flexible film. If the container is plastic, the plastic can be any possible plastic including e.g. polyethylene terephthalate (PET), polyethylene napthalate (PEN), other polyesters, polyethylene (e.g. high density polyethylene (HDPE)), polypropylene (PP), polystyrene (PS), polycarbonate and poly lactic acid (PLA). If the container is metal, it can be any possible metal including aluminum, steel, coated metal (e.g. varnish coated, printed or plastic coated, etc.).

The containers can be of any size including but not limited to 500 milliliters (mls), 591 mls, 1.0 liter, 1.25 liter, 1.45 liter, 1.5 liter, 1.95 liter or even from 150 mls to about 2000 mls, etc.

The item can be any consumer good e.g. beverage (e.g. water, carbonated beverage, energy drinks, fruit juice, milk, ice tea, etc.), food substances and other liquids e.g. oil, laundry detergent, dish detergent, etc.)

The primary package can be a beverage packaged in a plastic bottle.

The adhesives of this invention are particularly useful for stabilizing pallets of beverage containing bottles comprising PET.

Adhesive Composition

The adhesive can be a pressure sensitive adhesive.

The adhesive can be a hot melt adhesive. When a hot melt adhesive is used it is relatively low in viscosity to enable easy application. The hot melt adhesive can have a viscosity of less than 5,000 cps at 149° C., less than 2500 cps at 149° C., or even less than 2000 cps at 149° C.

The adhesive needs to have a balance of properties to enable both stabilization of the pallet and ease of removal of the secondary packages.

The hot melt adhesive can comprise polymer, tackifying agent and plasticizer. The adhesive can also further include a wax.

The hot melt adhesive can be based on a variety of polymers including but not limited to ethylene copolymers derived from ethylene and a co-monomer that includes vinyl unsaturation (e.g. ethylene vinyl acetate, ethylene methyl acrylate, ethylene ethyl acrylate, ethylene n-butyl acrylate, ethylene acrylic acid, ethylene methacrylate, ethylene methyl-methacrylate, ethylene 2-ethythexyl acrylate), styrene block copolymers (e.g. styrene-ethylene/butylene-styrene (SEBS), styrene-butadiene-styrene (SBS), styrene-ethylene/propylene-styrene (SEPS), styrene-isoprene-styrene block copolymers (SIS), and styrene-ethylene-ethylene-propylene-styrene (SEEPS) block copolymers) and olefin based polymers (e.g. amorphous poly alpha olefins, single-site (e.g. metallocene) catalyzed polyolefins, polyethylene based polymers, polypropylene based polymers, etc.) and blends thereof.

Useful commercially available single site catalyzed polyolefin polymers include propylene homopolymers available under the L-MODU trade designations from Idemitsu Kosan Co., Ltd. (Japan) including, e.g., L-MODU 5400 and 5410 polypropylene, propylene ethylene copolymers available under the LICOCENE series of trade designations from Clariant Int'l Ltd. (Muttenz, Switzerland) including, e.g., LICOCENE PP 1602 TP and PP 2602 TP, ethylene octene copolymers available under the AFFINITY series of trade designations from The Dow Chemical Company including, e.g. AFFINITY GA 1900 and AFFINITY GA 1950 and propylene ethylene copolymers available under the VISTAMAXX series of trade designations from ExxonMobil Chemical (Houston, Tex.) including e.g. VISTAMAXX 8880.

The hot melt adhesive can have a limited amount of plasticizer to prevent it from being too soft i.e. having low cohesive strength. When the hot melt is too soft, it does not stabilize the pallet effectively. The hot melt adhesive can have no greater than 20%, no greater than 1.5% by weight, no greater than 10% by weight, no greater than 7% by weight, no greater than 5% by weight, from 0% by weight to 10% by weight, from about 1% to 10% by weight, from 0% by weight to about 7% by weight, or even from about 1% to about 5% by weight of plasticizer.

Suitable plasticizers include, e.g., naphthenic oils, paraffinic oils (e.g., cycloparaffin oils), mineral oils, phthalate esters, adipate esters, olefin oligomers (e.g., oligomers of polypropylene, polybutene, and hydrogenated polyisoprene), polybutenes, polyisoprene, hydrogenated polyisoprene, polybutadiene, benzoate esters, dibenzoates (e.g. 1,4-cyclohexane dimethanol dibenzoate), animal oil, plant oils (e.g. castor oil, soybean oil), derivatives of oils, glycerol esters of fatty acids, polyesters, polyethers, lactic acid derivatives and combinations thereof.

Useful commercially available plasticizers include CALSOL 550 naphthenic oil from Calumet Specialty Products Partners, LP (Indianapolis, Ind.), KAYDOL OIL mineral oil from Sonneborn (Tarrytown N.Y.) PARAPOL polybutene from Exxon Mobil Chemical Company (Houston, Tex.), OPPANOL polyisobutylene from BASF (Ludwigsjhafen, Germany), KRYSTOL 550 mineral oil from Petrochem Carless Limited (Surrey, England), PURETOL 35 mineral oil from Petro Canada Lubricants Inc. (Mississauga, Ontario) and BENZOFLEX 352, a solid plasticizer available from Eastman Chemical Company (Kingsport, Tenn.).

Suitable classes of tackifying agents include, e.g., aromatic, aliphatic and cycloaliphatic hydrocarbon resins, mixed aromatic and aliphatic modified hydrocarbon resins, aromatic modified aliphatic hydrocarbon resins, and hydrogenated versions thereof; terpenes, modified terpenes and hydrogenated versions thereof; natural rosins, modified rosins, rosin esters, and hydrogenated versions thereof; low molecular weight polylactic acid; and combinations thereof. Examples of useful natural and modified rosins include gum rosin, wood rosin, tall oil rosin, distilled rosin, hydrogenated rosin, dimerized rosin and polymerized rosin. Examples of useful rosin esters include e.g., glycerol esters of pale wood rosin, glycerol esters of hydrogenated rosin, glycerol esters of polymerized rosin, pentaerythritol esters of natural and modified rosins including pentaerythritol esters of pale wood rosin, pentaerythritol esters of hydrogenated rosin, pentaerythritol esters of tall oil rosin, and phenolic-modified pentaerythritol esters of rosin.

Useful tackifying agents are commercially available under a variety of trade designations including, e.g., hydrocarbon resins under the ESCOREZ series of trade designations from Exxon Mobil Chemical Company (Houston, Tex.) including ESCOREZ 5380, 5400 and ESCOREZ 5600, hydrocarbon resins under the EASTOTAC series of trade designations from Eastman Chemical (Kingsport. Tenn.) including EASTOTAC H-130R and EASTOTAC H-130L.

The adhesive composition can be free of a wax, alternatively the adhesive composition can include a wax. When the adhesive composition includes a wax, the wax is present at from about 1% to about 25% by weight, from about 5% to about 20% by weight, or even from about 5% to about 18% by weight.

Useful classes of wax include, e.g., paraffin waxes, microcrystalline waxes, high density low molecular weight polyethylene waxes, by-product polyethylene waxes, polypropylene waxes, Fischer-Tropsch waxes, oxidized Fischer-Tropsch waxes, functionalized waxes such as acid, anhydride, and hydroxyl modified waxes, animal waxes, vegetable waxes (e.g. soy wax) and combinations thereof.

The adhesive composition optionally includes additional components including, e.g., additional polymers, stabilizers, antioxidants, adhesion promoters, ultraviolet light stabilizers, corrosion inhibitors, colorants (e.g., pigments and dyes), fillers, surfactants and combinations thereof.

Method of Stacking a Pallet

The invention includes a method of stacking a pallet including, grouping a plurality of primary packages, encasing the primary packages in a plastic film shrunk by heat to form a plurality of individual secondary packages, applying hot melt adhesive to at least two locations on the top of each of the individual secondary packages; and arranging the plurality of individual secondary packages on a pallet to form a plurality of layers, wherein the hot melt adhesive is sandwiched between two layers of secondary packages.

The hot melt adhesive can be applied at a temperature of less than about 150° C., less than about 145° C., or even from about 100° C. to about 150° C. to prevent distortion of the secondary packages.

The invention will now be described by way of the following non-limiting examples.

Examples

TABLE ONE

|  | Comparative 1 | Comparative 2 | Comparative 3 | Comparative 4 | Comparative 5 |
| --- | --- | --- | --- | --- | --- |
| Adhesive? | Adhesive 1 | Adhesive 1 | Adhesive 1 | Adhesive 1 | Adhesive 1 |
| Coat weight (g/pack) | 0.5 | 0.3 | 0.3 | 0.3 | 0.6 |
| Glue pattern | bead | swirl | swirl | swirl | bead |
| Position on secondary package | 4 corners | 6 (all caps) | 6 (all caps) | 6 (all caps) | 6 (all caps) |
| Glue actual temperature | 145-150° C. | 145-150° C. | 145-150° C. | 145-150° C. | 140° C. |
| Inter-layer? | No | No | No | No | No |
| Pallet wrap? | No | standard amount | less than standard | No | Standard amount |

Figure 2:
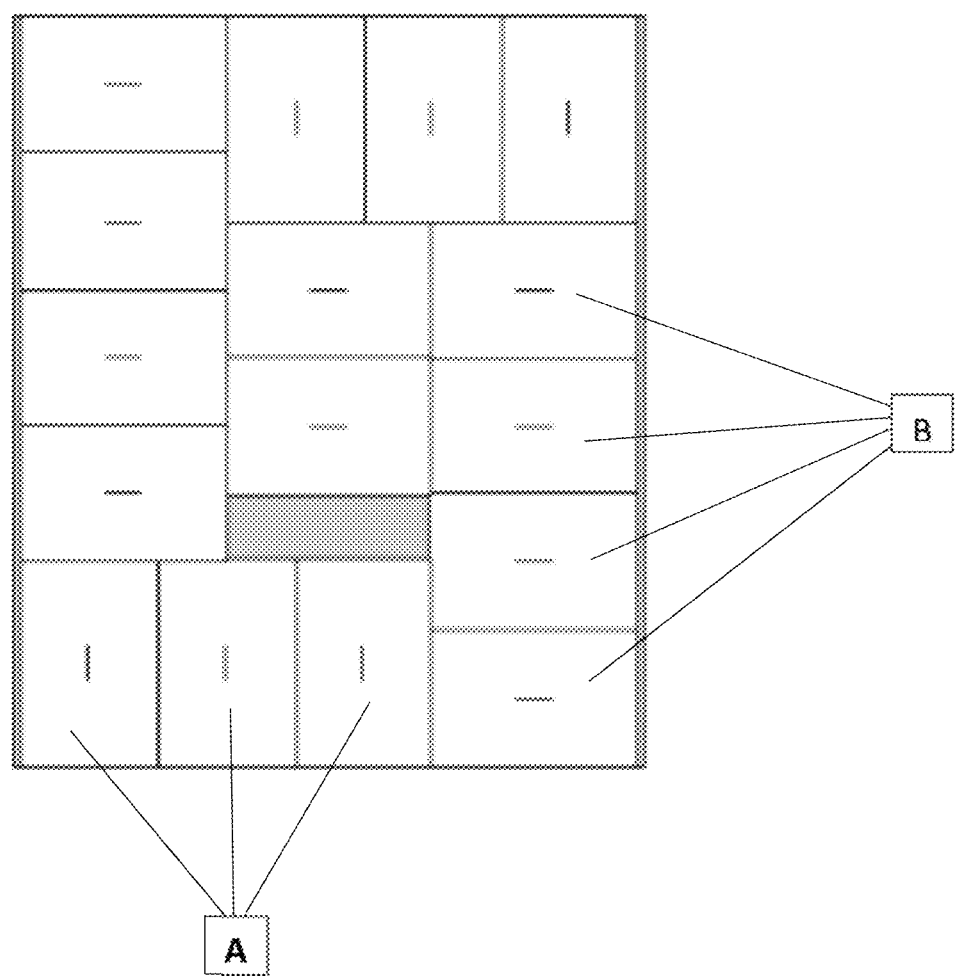
FIG. 2 is a top view of a layer of secondary packages arranged in an interlock formation.

Comment: Each pallet (Comparative 1-5) contained 4 layers of shrink wrapped secondary packages (2×3, 1.95 L) arranged in an interlock formation (FIG. 2). Pallet 5 was the most preferred. The bead did a better job of filling the gap between the top of one secondary package and the bottom of the one above it. Inventors further found that the pallet was more stable with adhesive applied to all caps of the secondary package. Finally an application temperature of less than 150° C. was preferred to prevent distortion of the shrink wrap of the secondary package. The inter-layer was removed, however in order to get maximum stability, the standard amount of pallet wrap was used.

TABLE TWO

|  | Adhesive 1 | Adhesive 2 | Adhesive 3 |
| --- | --- | --- | --- |
| Polymer Base | Styrene block copolymer | Styrene block copolymer | Metallocene catalyzed ethylene based |
| Viscosity at 149° C. |  | 930 cps | 1690 cps |
| Viscosity at 175° C. | 940 cps |  | 660 cps |
| Plasticizer content (weight %) | 30 | 11 | 2.6 |
| Wax content (weight %) | 2 | 14 | 15 |

|  | Comparative 6 (pallet stacked using Adhesive 1) | Comparative 7 (pallet stacked using Adhesive 2) | Example 1 (pallet stacked using Adhesive 3) |
| --- | --- | --- | --- |
| Inter-layer? | No | No | No |
| Pallet wrap? | Yes | Yes | Yes |
| Secondary packages can be separated from each other by hand? | Yes | Yes | Yes |

TABLE TWO-continued

| | | | |
|---|---|---|---|
| Interlock stacked pallet stable during normal handling and transportation? | No | No | Yes |

*Pallets 6-8 were stacked interlock fashion (FIG. 2) using the same parameters as Pallet 5 in Table 1, with the exception that the primary package was a 1.25 liter PET carbonated beverage bottle and the secondary package was twelve bottles in a 4 × 3 configuration, shrink wrapped together with 0.1 gram bead of adhesive applied to the top of each bottle.

Test Procedures

Test procedures used in the examples and throughout the specification, unless stated otherwise, include the following.

Viscosity Test Method

Viscosity is determined in accordance with ASTM D-3236 entitled, "Standard Test Method for Apparent viscosity of Adhesives and Coating Materials," (Oct. 31, 1988), using a Brookfield Thermosel viscometer Model RVDV 2 and a number 27 spindle. The results are reported in centipoise (cps).

Other embodiments are within the claims.

What is claimed is:

1. A stacked pallet comprising:
   a pallet,
   a plurality of layers of secondary packages stacked on the pallet, and
   a hot melt adhesive sandwiched between the layers of secondary packages thereby adhering the layers to each other, the hot melt adhesive comprising:
      a polymer selected from the group consisting of ethylene copolymers derived from ethylene and a co-monomer that includes vinyl unsaturation, styrene block copolymers, and olefin based polymers, and no greater than 10% by weight of a plasticizer.

2. The stacked pallet of claim 1 being free of inter-layer.

3. The stacked pallet of claim 1 wherein the secondary packages include at least 4 primary packages.

4. The stacked pallet of claim 1 wherein the secondary packages are formed by a shrinkable film.

5. The stacked pallet of claim 3 wherein the primary packages comprise a beverage packaged in a plastic container.

6. The stacked pallet of claim 5 wherein the plastic container comprises PET.

7. The stacked pallet of claim 1 wherein each layer of secondary packages is in an interlock formation.

8. The stacked pallet of claim 3 wherein the hot melt adhesive is applied to the top of each of the primary packages.

9. The stacked pallet of claim 1 wherein the hot melt adhesive has a viscosity of no greater than about 2500 cps at 149° C.

10. The stacked pallet of claim 1 wherein the hot melt adhesive has a wax content of from about 5% to about 20% by weight.

11. The stacked pallet of claim 1 wherein the hot melt adhesive has a plasticizer content of no greater than about 5% by weight.

12. The stacked pallet of claim 1 wherein the hot melt adhesive has a plasticizer content of from about 1% to about 10% by weight and a wax content of from about 5% to about 20% by weight.

13. The stacked pallet of claim 1 wherein the hot melt adhesive comprises an olefin based polymer.

14. The stacked pallet of claim 13 wherein the olefin based polymer is a single site catalyzed polymer.

15. The stacked pallet of claim 1 wherein the hot melt adhesive is applied as a bead.

16. The stacked pallet of claim 1 wherein each secondary package comprises from about 0.5 to about 3.0 grams of the hot melt adhesive.

17. A method of stacking a pallet comprising:
   grouping a plurality of primary packages,
   encasing the primary packages in a plastic film shrunk by heat to form a plurality of individual secondary packages,
   applying hot melt adhesive to at least two locations on the top of each of the individual secondary packages; and
   arranging the plurality of individual secondary packages on a pallet to form a plurality of layers, wherein the hot melt adhesive is sandwiched between two layers of secondary packages, the hot melt adhesive comprising:
      a polymer selected from the group consisting of ethylene copolymers derived from ethylene and a co-monomer that includes vinyl unsaturation, styrene block copolymers, and olefin based polymers, and no greater than 10% by weight of a plasticizer.

18. The method of claim 17 wherein the hot melt adhesive is applied in a bead to the top of each primary package.

19. The method of claim 17 wherein the hot melt is applied at a temperature of no greater than about 150° C.

20. The method of claim 17 wherein the secondary packages are arranged in an interlock formation.

* * * * *